Inventors
Harold W. Scholin
Carl W. Scholin
By:- Spencer, Johnston, Cook & Root Attys.

INDEXING MECHANISM
Filed July 14, 1952 5 Sheets-Sheet 2
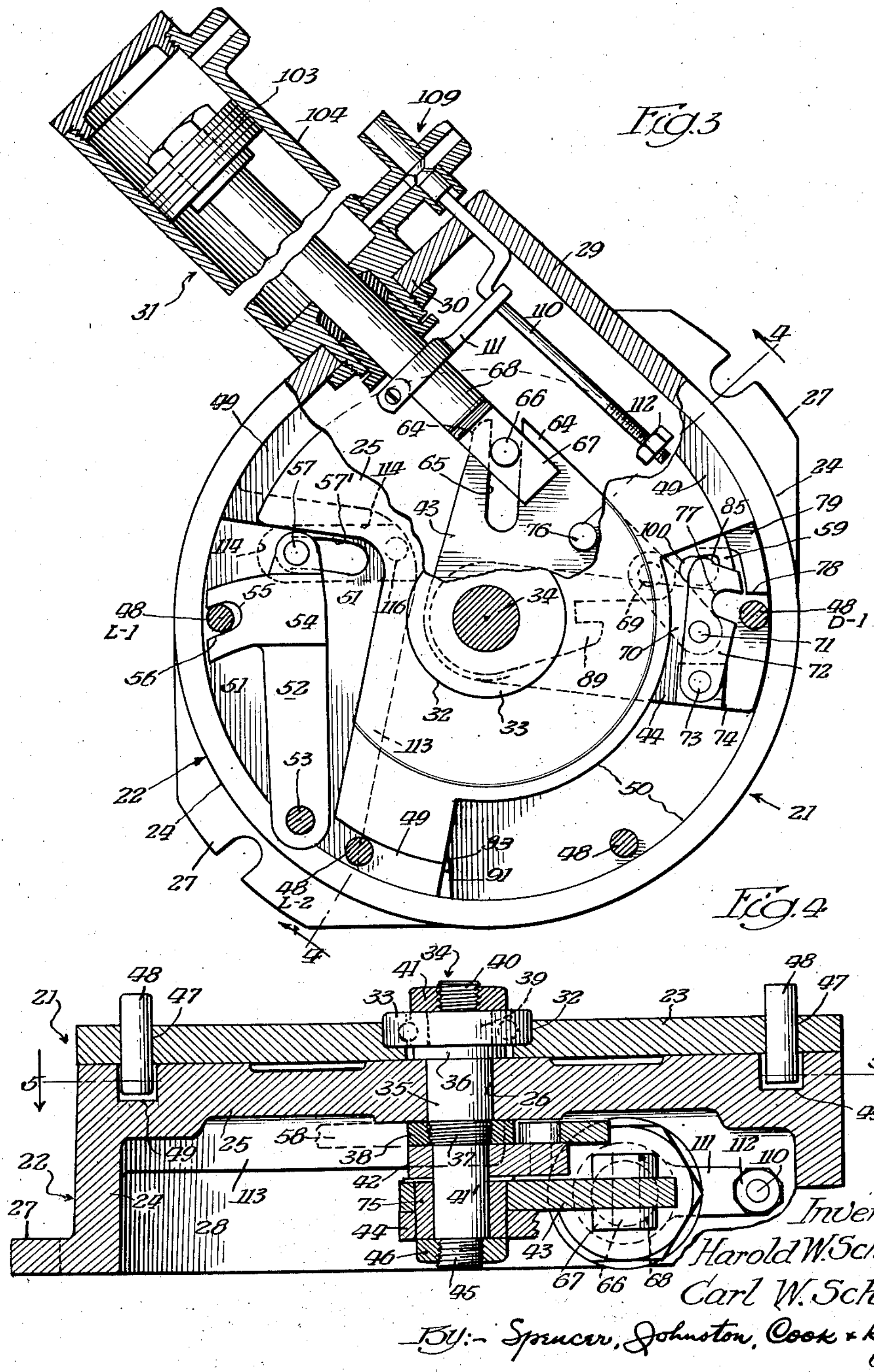
Inventors:
Harold W. Scholin
Carl W. Scholin
By:- Spencer, Johnston, Cook & Root
attys.

Inventors:
Harold W. Scholin
Carl W. Scholin
By:- Spencer,
Johnston, Cook & Root
attys.

INDEXING MECHANISM
Filed July 14, 1952 5 Sheets-Sheet 4
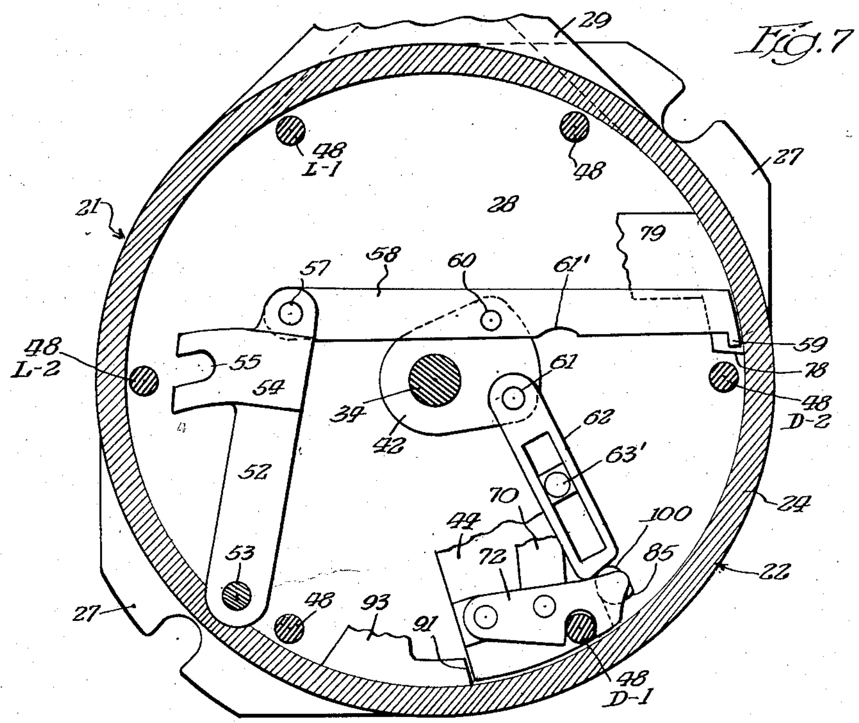
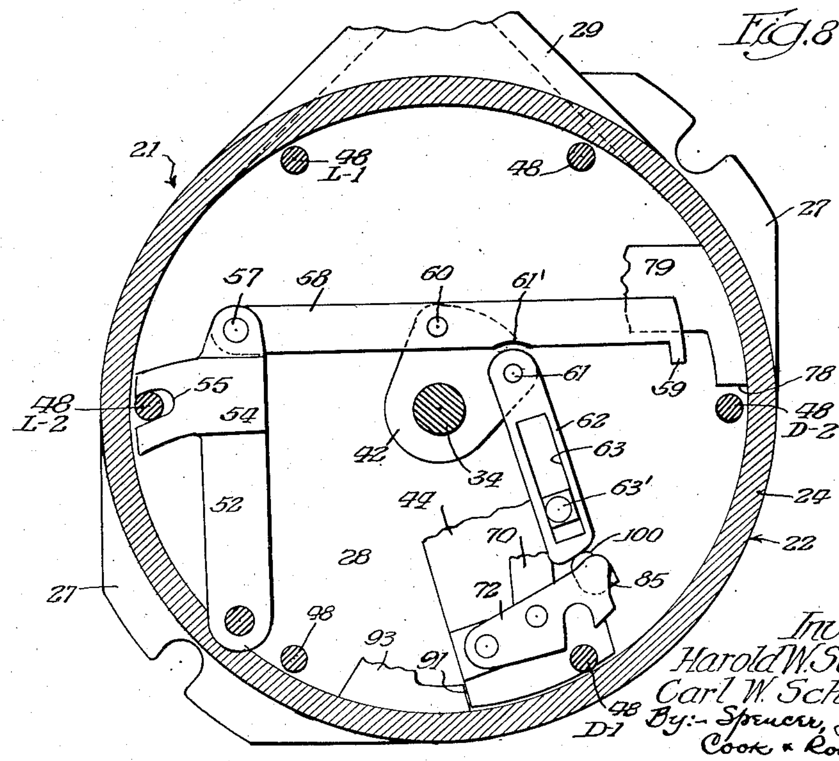
Inventors:
Harold W. Scholin
Carl W. Scholin
By:- Spencer, Johnston, Cook & Root Attys.

March 11, 1958 H. W. SCHOLIN ET AL 2,826,099
INDEXING MECHANISM
Filed July 14, 1952 5 Sheets-Sheet 5
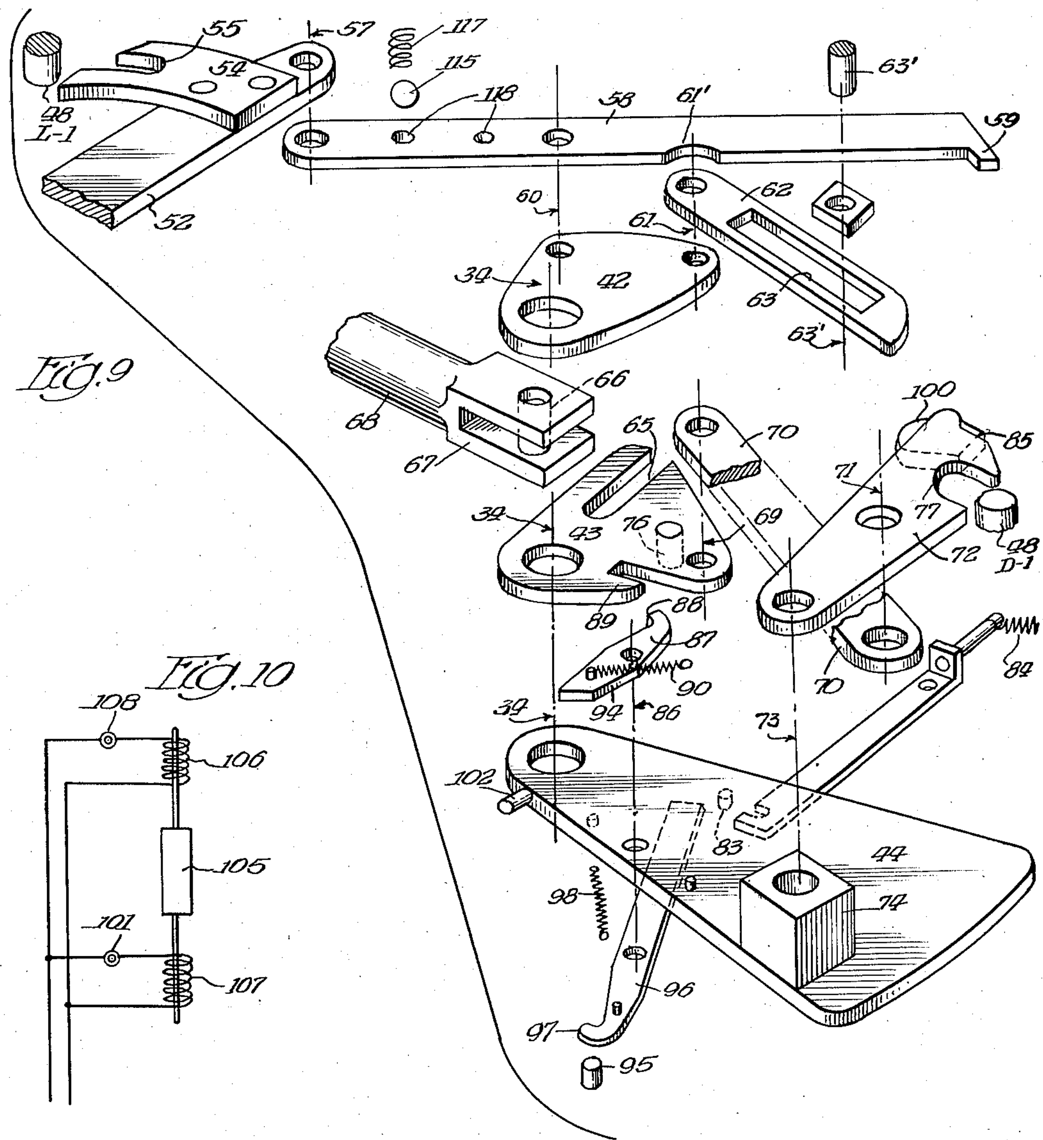
Inventors:
Harold W. Scholin
Carl W. Scholin
By: Spencer, Johnston, Cook & Root attys.

United States Patent Office 2,826,099 Patented Mar. 11, 1958

1

2,826,099

INDEXING MECHANISM

Harold W. Scholin and Carl W. Scholin, Chicago, Ill.

Application July 14, 1952, Serial No. 298,665

10 Claims. (Cl. 74—822)

The present invention relates, in general, to the indexing of work material and material working tools, and has more particular reference to improved index mechanism comprising a turntable support or table and associated means for accurately latching the same in each of a plurality of precisely predetermined angularly displaced positions.

Turntable indexing supports or tables of the character mentioned are especially useful, in connection with the operation of machine tools, for the purpose of supporting and relatively shifting a work piece, or a succession of work pieces, with respect to a tool or tools, or for shifting a tool or tools with respect to a work piece or pieces, through a series of accurately located work stations or positions. The use of indexing mechanism, of course, is not necessarily limited to operation with machine tools, but such mechanism may be employed wherever required to provide or to accomplish indexing movement.

An important object of the present invention is to provide an indexing table of the character mentioned having means operable to turn the table, about its axis, successively through precisely predetermined table displacement angles; a further object being to provide improved means for latching the table precisely in a desired relative angular position, at the conclusion of table turning movement; a still further object being to provide improved mechanism operable to release the table latching means in response to actuation of the table turning means, at the commencement of a table turning stroke of said turning means, and to relatch said table precisely in a desired oriented position at the conclusion of the operating stroke of the table turning means.

Another important object is to provide a turnable table structure having a plurality of projecting pins forming latching teeth or detents, disposed circularly on said table and equally spaced from the turning axis of the table, the axis of each adjacent pair of pins subtending an accurately predetermined angle, at the turning axes of the table, which preferably is exactly equal to the angle subtended by the axes of every other pair of said pins; a further object being to provide a retractable latch in position to snugly engage a said pin, whenever the table is oriented on its turning axis, in indexed position, presenting said pin in situ for cooperation with said latch, whereby each of said pins, when engaged by said latch, will precisely determine and fix the corresponding relatively turned index position of the table.

Another important object is to provide an indexing table having a plurality of latching teeth or detents comprising cylindrical, angularly spaced, projecting latch pins and an indexing latch comprising a lever pivoted on a fixed axis and having a latch engaging portion forming an open ended notch providing sides curved on the pivotal axis of the lever and spaced apart a distance substantially equal to the diameter of said pins.

Another important object is to provide an indexing table structure having a plurality of latching and driving teeth comprising pins disposed circularly on said table and equally spaced from the turning axis of the table, and indexing latch adapted to latchingly engage said pins to secure the table in each of a plurality of angularly displaced indexing positions corresponding with said pins, and table turning means embodying a normally inoperative driving dog adapted to drivingly connect with said pins to turn the table from one indexed position to another.

Another important object is to provide means of the character mentioned, wherein the driving dog is normally held in retracted inoperative position with respect to said driving and latching teeth, while the indexing latch is normally held in latching engagement with one of said teeth whereby to hold the table in a corresponding indexed position presenting a said tooth in latching alinement with the retracted driving dog; a further object being to provide means operable to project the driving dog, from its retracted inoperative position, into driving engagement with the tooth in alignment therewith, and simultaneously to retract the indexing latch from its normal tooth latching position to thus release the table structure turning movement.

Another important object is to provide table moving means operable to turn the driving dog, in one direction, while latched with one of the driving and latching teeth, from a starting position, through a precisely determined angular displacement, whereby to shift the table structure from one indexed position to another relatively shifted position, and to then retract the dog from said tooth and return the dog, in retracted condition, to said starting position, in latching registration with another of said teeth; a further object being to provide means operable, during and as a consequence of dog retracting movement, to project the indexing latch into latching engagement with one of said teeth, presented in latching registration with the indexing latch when the table structure reaches such shifted position.

Another important object is to provide for latching the table turning means in its normally inactive condition and to provide for releasing the mechanism for table turning action in response to pin releasing retraction of the indexing latch and pin engaging projection of the driving dog.

Another important object is to provide a dog carrying link, pivotally supporting the driving dog, and a driving link connected with said dog, said links being turnable on a common axis, whereby to project the dog, from retracted to projected tooth engaging position, in response to relative turning movement of the driving link with respect to the dog carrying link; a further object being to provide means for drivingly connecting the links when the dog reaches projected tooth engaging position to thereafter move the dog carrying link and the tooth engaging dog in response to continued movement of the driving link.

The foregoing and numerous other important objects, advantages, and inherent functions of the invention will become apparent as the same is more fully understood from the following description, which, taken in connection with the accompanying drawings, disclosed a preferred embodiment of the invention.

Referring to the drawings:

Fig. 1 is a partially sectionalized top view of indexing mechanism embodying the present invention;

Figs. 2, 3 and 4 are sectional views, respectively taken along the line 2—2 in Fig. 1, the line 3—3 in Fig. 2, and the line 4—4 in Fig. 3;

Figs. 5, 6, 7 and 8 are sectional views taken substantially along the line 5—5 in Fig. 4, and respectively showing the operating elements of the mechanism in various relatively shifted positions;

Fig. 9 is a perspective view showing the several operating elements of the mechanism; and Fig. 10 is a diagram of electrical connections.

Figures 1, 2:
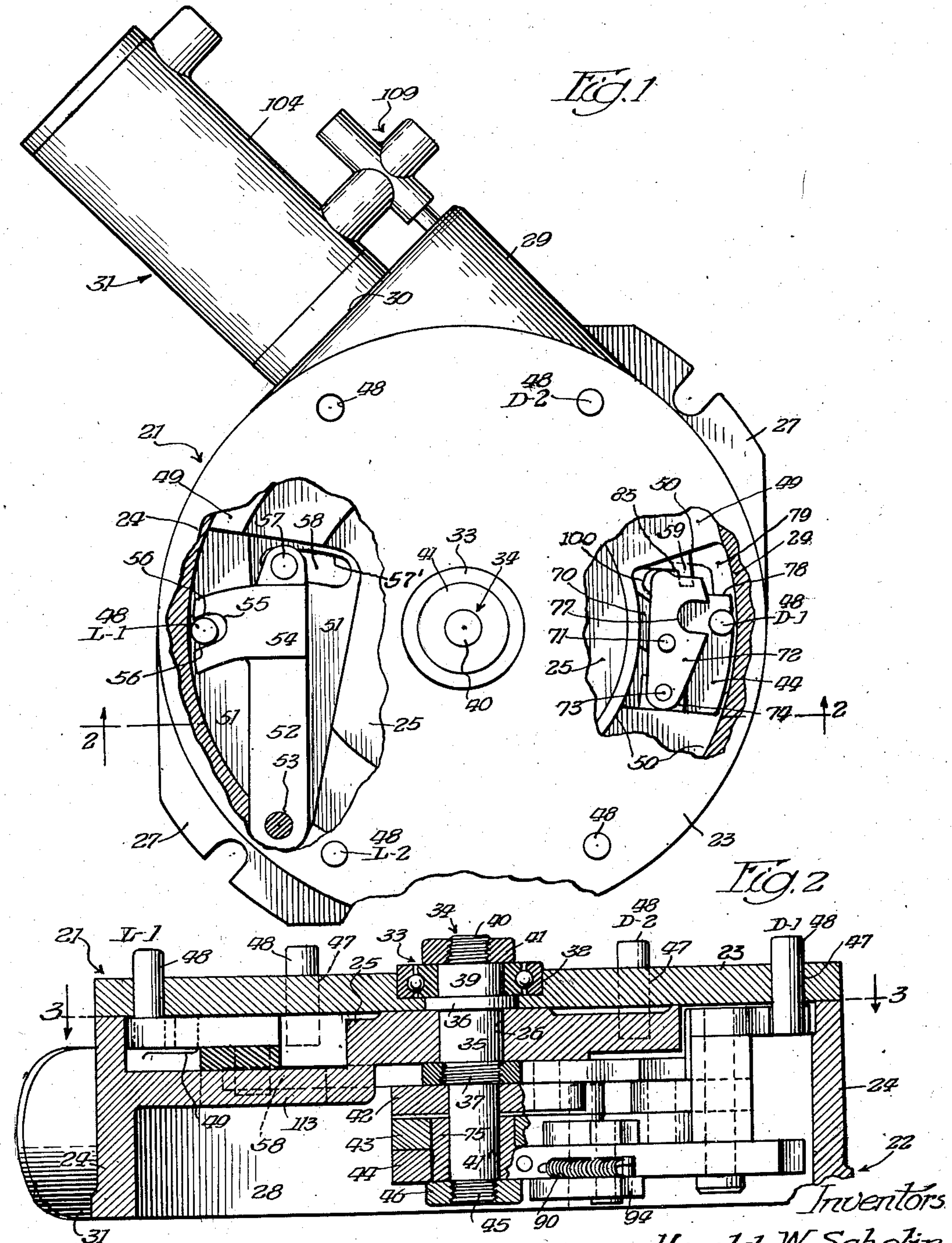

To illustrate the invention, the drawings show an indexing mechanism 21 comprising a frame or base 22 carrying a table member 23 turnably mounted on said base.

As shown, the base 22 may comprise a hollow member having marginal side walls 24 of generally cylindrical configuration, a top wall 25 formed with a central opening 26, and bottom flanges 27 for aiding in the attachment of the frame 22 on a suitable support, such as the frame of a machine tool structure upon which it may be desired to mount the indexing mechanism. The frame 22 thus defines a chamber or cavity 28 within the side walls 24 and beneath the top wall 25; and the chamber 28 may be open at the bottom of the frame, although a suitable bottom cover may be provided, if desired.

On one side of the frame 22, the marginal walls 24 may be formed to provide an extension 29 providing a seat 30 for the support of motive means 31 for the actuation of the indexing mechanism.

The table member 23 preferably comprises a circular disk or plate formed with a central opening providing a seat 32 for a bearing 33, which preferably comprises a roller bearing having an outer race member, adapted to be press fitted in the seat 32 and thus secured to the table member 23, and an inner race member adapted to be press fitted upon a spindle 34, secured on the frame 22. Mechanism is provided for turning the plate on the spindle 34, from any one of a plurality of angularly displaced index positions, through a precisely predetermined displacement angle, to another of said index positions, in response to operation of the motive means 31, and for latching the table precisely in each of said index positions to which the table may be turned. Such mechanism is preferably mounted within the chamber 28 and comprises driving links carried by the spindle, and latches and cams actuated by said links, for the control of the angular displacement and latchment of the table member about the spindle.

To these ends, the spindle 34 may comprise a stem having a portion 35 sized to snugly fit the central opening 26 in the top wall 25 of the frame 22, a flange portion 36 adapted to overlie the top of the wall 25 outwardly of the opening 26, a preferably threaded portion 37 adjacent the portion 35 and adapted to extend beneath the wall 25 for the reception of a fastening nut 38, to thereby secure the spindle 34 rigidly on the wall 25, in the opening 26, by clamping the wall 25, outwardly of the opening 26 between the flange 36 and the clamping nut 38. The spindle 34 also may include a portion 39, formed for the press fitted reception of the inner race element of the bearing 33, and a preferably threaded portion 40 for the reception of a holding nut 41, whereby to secure said inner race element, on the stem portion 39, between the flange 36 and the nut 41. The stem 34 may also include a portion 41' extending on the side of the threaded portion 37 remote from the stem portion 35 and centrally within the chamber 28, said stem portion 41' being formed to turnably support, thereon, driving links 42, 43 and 44 forming a part of the table turning and latching mechanism of the present invention, the end of the stem adjacent the portion 41' being preferably threaded as at 45 for the reception of a fastening nut 46 to secure the links 42, 43 and 44 pivotally on the spindle portion 41.

The table member 23 is also formed with a plurality of preferably circular openings 47, circularly spaced apart therein, inwardly of the marginal edge thereof. These openings 47 are of like diametral dimension and are equally spaced from the axis of the spindle 34 which defines the turning axis of the table member 23 on the frame or base 22. The openings 47 each carry an indexing pin 48 firmly press fitted therein, the opposite ends of the pins 48 preferably projecting from the plate 23 on the opposite sides thereof, to form latching and indexing teeth on the table member 23. The openings 47 are carefully and precisely located in the member 23 to present the pins 48 in position such that the axes of each adjacent pair of said pins subtend an accurately predetermined angle, at the axis of the spindle 34, which angle is preferably identical to the angle subtended by the axes of every other adjacent pair of pins 48.

In order to accommodate the ends of the pins 48 which project at the underside of the plate 23, the wall 25 of the base 22 may be formed with an upwardly opening circular channel 49. The wall 25 also is formed with an arcuate opening 50, therethrough, in position intercepting the channel 49, adjacent a portion of the wall 24, which opening preferably subtends an angle, at the axis of the spindle 34, at least somewhat greater than the angle subtended by the axes of an adjacent pair of the pins 48. The upper face of the wall 25 may also be formed with an upwardly opening shallow pocket 51 of generally triangular shape, which pocket also intercepts the channel 49 adjacent another portion of the wall 24, said pocket having a curved side wall in a common circular plane with the outer wall of the channel 49, an end wall extending transversely inwardly of the curved wall, and a side wall facing the curved wall, extending substantially normal to the end wall, and making a relatively sharp pocket corner with said curved wall.

A latch member 52 comprising a bar-like arm is pivotally mounted, at one end, for swinging movement, within the pocket 51, on a pivot pin 53, secured on the frame 22, beneath the pins 48, at the sharp corner of the pocket, the pivot pin 53 being preferably spaced from the axis of the spindle 34, a distance substantially equal to the spacement of the pins 48 from the axis of said spindle. The pins 48, during turning movement of the table member 23, may pass freely over the pivot pin 53 and the pivoted end of the latch member 52.

The latch member 52 includes an upwardly offset latching head 54, spaced from the pivot pin 53, swingable adjacent the end wall of the pocket, and formed with a latching notch 55 having an open end and facing sides 56, said sides being curved on circles, centering at the axis of the pivot pin 53, and spaced apart a distance equal to the diametral dimension of the latch pins 48, whereby to snugly receive one of the pins 48, in the latching notch 55, when the member 52 is in the latching position shown in Fig. 3 of the drawings.

The pivot pin 53, of course, is rigidly mounted on the frame 25 and is accurately fitted in the member 52. The pin engaging surfaces 56 also are accurately finished. Accordingly, when the member 52 is in latching engagement with any of the pins 48, the table 23 will be latchingly secured precisely in the angularly oriented position on the spindle 34, corresponding with the location, in the member 23, of the pin 48 which is then latchingly engaged in the notch 55.

Means may be provided for retracting the member 52 from pin latching position by swinging the member within the cavity 51 about the pivot pin 53, and for advancing the latch member 52, from such retracted position, into latching engagement with a pin 48 disposed in position to be latched. For such purpose, the end of the member 52, remote from the pivot pin 53, may be provided with a driving pin 57, extending thence downwardly through an arcuate opening 57' formed through the wall 25 and communicating the cavity 51 with the chamber 28 below the wall 25, the pin 57, below the wall 25, being connected with one end of an arm or link 58 extending thence transversely of the frame 22, for connection with the table turning and latch actuating mechanism mounted on the base within the chamber 28, the end of the arm 58 remote from the pin 57 being formed with a finger 59.

The link 42 comprises a plate freely turnable on the spindle 34 and carrying a pin 60 spaced outwardly of the spindle 34 in position to pivotally connect with the link 58, medially of the ends thereof, whereby to actuate the latch member 52 in response to turning movement of the link 42 on the spindle. The link 42 also carries a pin 61 outwardly of the spindle 34 in position to pivotally engage an end of a link driving arm 62, which may lie in a common plane with the arm 58, said arm 58 being provided with a notch 61' to accommodate the end of the arm 62 when the parts are in the latching position shown in Figs. 3, 5 and 8. The arm 62 is formed with a longitudinal guide slot 63 adapted to slidingly receive a guide pin 63' fixed on and dependent from the wall 25, inwardly of the opening 50, to guide the arm in desired fashion.

The link 43 is of generally triangular shape and is pivotally mounted on the spindle 34 at one of its corners. It provides a pair of arms 64, defining a slot 65 extending substantially radially of the spindle 34, at a corner of the triangular link, remote from the spindle, said slot comprising facing surfaces adapted to receive a driving pin 66 slidingly therebetween. This driving pin may be mounted in a clevis 67 carried on the end of an actuating shaft 68 axially moveable by operation of the motive means 31. The triangular link 43, in the corner thereof remote from the stem 34 and the driving slot 65, may carry a driving pin 69 having pivotal connection with one end of a link 70, the opposite end of which is drivingly connected with a pin 71 mounted on a driving dog 72, said driving dog being pivotally secured on a pin 73, fastened into the upper end of a pedestal 74, forming an integral portion of the link 44.

The link 44 preferably comprises a bar pivotally connected, at one end, on the portion 41' of the spindle 34, and extending thence radially outwardly of the spindle, within the chamber 28, the spindle remote end of the link 44 terminating beneath the marginal portions of the plate 23 which carry the pins 48. The spindle mounted end of the link 44 preferably comprises a bushing 75 forming a bearing, concentric with the axis of the spindle 34, on which bearing the link 43 is turnably mounted, with respect to the link 44, about the axis of the spindle 34. The link 43 thus overlies the link 44 and carries a dependent pin 76, outwardly of the spindle 34, in position to drivingly engage a side edge of the link 44, to turn the same in a clockwise direction, viewing Fig. 5, in response to clockwise turning movement imparted in the link 43 by operation of the stem 68.

The dog carrying pedestal 74 is mounted on and extends upwardly of the link 44, within the arcuate opening 50 in the top wall 25 of the frame or base 22, the upper end of the pedestal being disposed opposite and radially immediately inwardly of the downwardly extending ends of the pins 48 to thereby support the dog 72 in position to latchingly engage with the lower ends of said pins. To this end, the dog 72, on the side thereof which faces away from the spindle 34, is provided with a pin receiving latch notch 77 having facing notch defining surfaces spaced apart a distance substantially equal to the diametral dimension of the pins 48.

Figure 5:
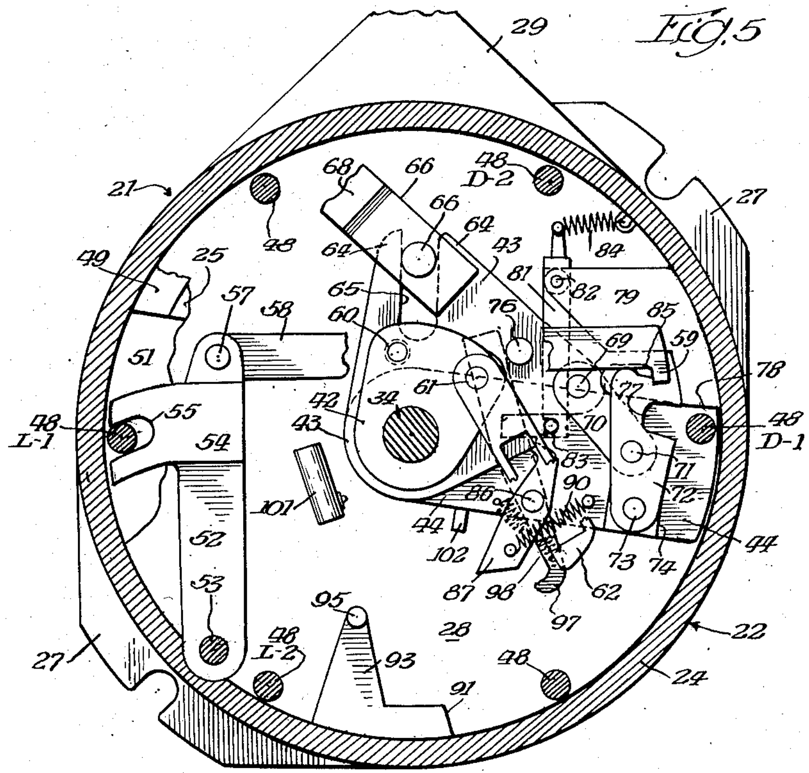

The normal stand-by or latched position of the parts is shown in Figs. 3 and 5. In such position, the latch 52 is in holding engagement with an indexing pin 48, such as the pin L–1, on one side of the table structure. The dog 72 is in retracted position, on the link 44, presenting its latching notch 77 in alinement with another of the pins 48, such as the pin D–1, remote from the pin which is latched with the member 52. In such stand-by position, the link 44 is in abutting engagement with a stop shoulder 78, formed on a bracket portion 79 of the base, the link 44 being secured in such position by means of a latch 81, pivotally mounted on a pin 82, carried on the frame 22, as on the bracket portion 79. The latch 81 may be formed with a notch for latchingly receiving a pin 83, on and extending downwardly of the link 44, and the latch may be normally urged toward latching position by means of a spring 84, connected between the latch 81 and the frame 22.

In order to shift the table, from the oriented position determined by engagement of the latch member 52 with the index pin L–1, to the position determined by engagement of the latch member 52 with the next adjacent pin L–2, the motive means may be set in operation to move the shaft 68 axially inwardly of the seat 30. Such movement of the shaft, by action of the pin 66 in the slot 65, will turn the link 43, on the spindle 34, in a clockwise direction, viewing Fig. 5. Such movement of the link will initially project the dog 72, on the latched link 44, in a clockwise direction, viewing Fig. 5, from retracted to pin engaging positions latched with the pin D–1, which, in stand-by position, is in registration with the latching notch 77 of the dog 72.

The dog, at its end remote from its pivot 73, is provided with a shoulder lug 85, in position to engage the finger 59, on the end of the latch actuating link 58, remote from its pivotal connection with the latch 52. As a consequence, movement of the dog 72, from retracted to pin engaging position, will shift the member 58 in a direction to retract the latch 52 from engagement with the pin L–1, with which said latch is engaged when the mechanism is in stand-by position, thus releasing the table member for turning movement. Such latch releasing movement of the link 58 will also turn the link 42 on the spindle 34, in a clockwise direction viewing Fig. 5, and will move the member 62 on its guide pin 63' to a projected position shown in Fig. 6.

At the conclusion of its initial dog projecting and latch retracting movement, the member 43 will have advanced the pin 76 against the latch member 81 sufficiently to release the same from the pin 83, against the influence of the spring 84, and also will have presented the pin in driving engagement with the edge of the link 44.

Means may be provided for latching the links 43 and 44 together, when the pin 76 makes driving engagement with the link 44. To this end, the link 44, inwardly of the pedestal 74, may carry a pivot pin 86 extending upwardly thereof adjacent a side of the link 43, said pin 86 pivotally supporting a latch member 87 thereon. The latch member 87 may be formed with a latching finger 88 in position to latchingly engage a latch lug 89, formed on the link 43, adjacent the pivot pin 69, whereby to latch the links 43 and 44 together against relative turning movement in a direction to retract the drive pin 76 from the link 44. The latch member 87 may be normally urged on its pivot pin 86, in a direction to latchingly engage the finger 88 with the lug 89, as by means of a spring 90, connected between the member 87 and the link 44. As a consequence, during the initial dog projecting and latch retracting movement of the member 43, with respect to the latched link 44, the latch finger 88 will be pressed against and will ride upon the end of the lug 89, under the influence of the spring 90, in readiness to latch with the lug, as and when the pin 76 comes into engagement with the link 44.

After latchment of the finger 88 with the lug 89, to thereby secure the links 43 and 44 in position presenting the dog 72 in latching engagement with the pin D–1, continued axial movement of the driving stem 68, inwardly of the seat 30, will cause relative turning movement of the latched links 43 and 44, the pin engaged dog and the pin D–1 engaged thereby, about the spindle 34, in a clockwise direction from the relative positions thereof shown in Fig. 5, thereby correspondingly turning the table member 23 on the spindle. Such turning movement may continue until the mechanism reaches the fully projected position shown in Fig. 6. In such position, the link 44 makes engagement with a stop shoulder 91 formed on the frame 22, as by means of a bracket 93 fixed on the frame, in position presenting the shoulder 91 in the path of the link 44. When the mechanism reaches such projected position, the table 23 will have been turned on the spindle 34 through an exactly determined displacement angle required to present the pin L–2 in latching registration with the notch 55 of the latch member 52.

Figure 6:
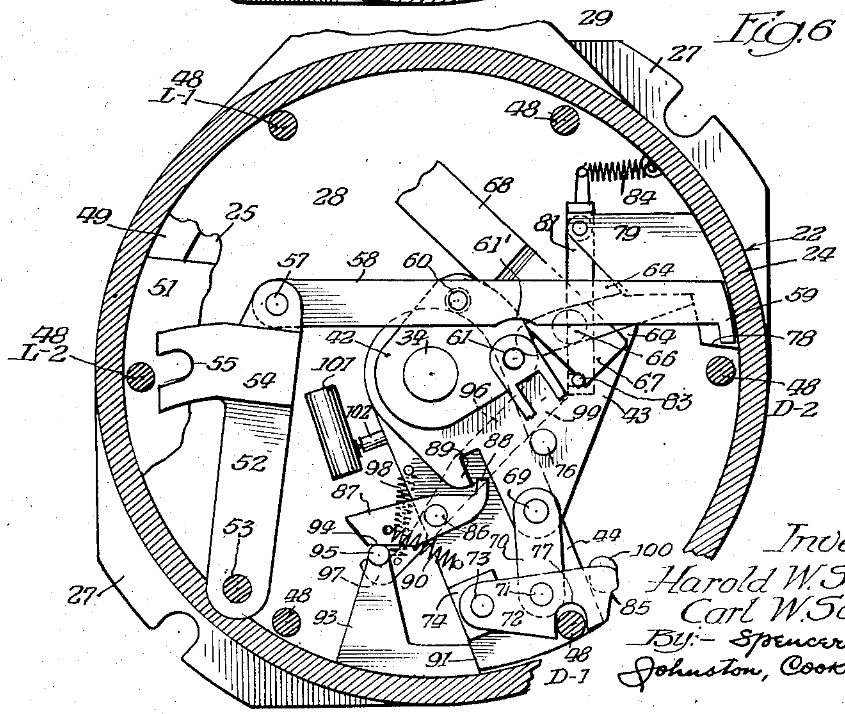

The latch member 87 is formed with a latch releasing cam surface 94 in position to engage a latch releasing pin 95 fixed on the frame 22, as on the bracket portion 93 thereof, to thereby retract the latch 87 against the influence of the spring 90 and release the finger 88 from the lug 89, as the mechanism reaches its projected position shown in Fig. 6. The link 44 may also carry a latch member 96 having a hooked portion 97 at one end thereof in position to latchingly engage with the pin 95 when the mechanism reaches its projected position. This latch member 96 may be pivotally mounted on the link 44, as on the pivot pin 86, medially of the opposite ends of the member 96. A spring 98 connected between the link 44 and the latch member 96 may be employed to normally urge the latch member 96, about the pivot pin 86, in a direction toward latching engagement with the pin 95.

The end 99 of the latch member 96, on the side of the pivot 86, remote from the latch portion 97, may extend adjacent the pin 76, on the link 43, the spring 98 normally urging the member 96 yieldingly in a direction pressing its end 99 toward the pin 76. Accordingly, as and when the mechanism reaches its projected position, the link 44 will become latched, by action of the member 96 in cooperation with the pin 95. At the same instant, the link 43 will become unlatched from the link 44 by retraction of the latch member 87.

During the projecting movement of the mechanism, the link 42 will have become turned in a clockwise direction, from the position shown in Fig. 5, through the position thereof shown in Fig. 6, to the relative position illustrated in Fig. 7, in which the end of the arm 62, remote from the pivot 61, will be presented in abutting relationship with a driving cam 100 formed at the end of the dog 72, remote from the pivot pin 73 and adjacent the shoulder 85.

At the conclusion of the projecting movement of the mechanism, the motive means 31 may be reversed to cause axial retraction of the driving stem 68 in a direction outwardly of the seat 30. If desired, such reversal may be accomplished under the control of a microswitch 101 mounted on the frame 22, within the chamber 28, in position to be actuated by a switch operating finger 102, on the link 44, as said link reaches its fully projected position. Retraction of the stem 68 will initially cause retracting movement of the link 43, in a counterclockwise direction viewing Fig. 6. Such movement will cause retraction of the dog 73 and disengagement thereof from the stud D-1. Such dog disengaging movement, by action of the cam portion 100 upon the end of the arm 62, will turn the link 42 in a counterclockwise direction, from the position thereof shown in Fig. 7, to the position illustrated in Fig. 8, such movement driving the link 58 in a direction to engage the latch 52 with the pin L-2, which is then registered with the latching slot 55.

During retraction of the dog 72, the dog retracting movement of the link 43 will press its pin 76 upon the latch member 93 and move the same, against the influence of the spring 98, in a direction to release the latching portion 97, from the pin 95, and thus release the link 44 for retracting movement, along with link 43, during the remainder of the retracting movement of the stem 68 toward starting or stand-by position, that is to say, the position shown in Fig. 5 of the drawings.

It will be seen from the foregoing that the mechanism provides relatively simple, yet positive, means for latching the table member 23 successively in each of a plurality of angularly displaced index positions precisely determined by the indexing pins 48 and the precision latch 52. The mechanism additionally provides for releasing the table member and turning the same from each index position, determined by a corresponding pin 48, to the position determined by another of the indexing pins. The action of the mechanism, also, may be made substantially automatic, that is to say, the table member may be released, turned and relatched merely in response to operation of a suitable control means, such as an electric switch.

Any preferred or convenient motive means 31 may, of course, be employed for moving the rod 68. Indeed, if desired, the rod 68 may be provided with a handle outwardly of the seat 30 for manual operation of the rod; or motor driven cam means may be employed for reciprocating the rod. As shown, the motive means 31 may comprise a fluid pressure actuated piston 103 connected with the rod 68 and operable in a cylinder 104, suitably secured on the frame 22 at the seat portion 30 thereof. The motive means may include suitable fluid supply conduits, connected with the cylinder 104, for the delivery and discharge of a fluid actuating medium to and from the cylinder. Such conduits may include valve means 105, controlled electrically, as by means of solenoids 106 and 107, and adapted to control the valve means to supply the fluid medium in the chamber, respectively to project and to retract the stem 68. Suitable circuit means may be provided for energizing the solenoids 106 and 107, respectively, under control of a push button switch 108 and the microswitch 101 to accomplish the desired operating cycle in automatic fashion.

If desired, a valve 109 may be included, in the fluid supply conduit means to the cylinder 104, for the purpose of stopping the projecting movement of the stem 68 when the same reaches a desired projected position. To this end, the valve 109 may be controlled by a stem 110 extending adjacent the actuating stem 68. The stem 68 may carry an arm 111 slidable longitudinally of the stem 110, in position to abut against a stop nut 112, whereby to operate the valve 109 and disable the motive means when the stem 68 reaches a desired displacement limit. The stop nut is preferably threaded upon the stem 110 and is hence adjustable longitudinally thereof, to provide for adjusting the operating stroke of the stem 68.

Any suitable or preferred means may be provided for anchoring a work piece or pieces upon the turnable table member 23. To this end, a carrying plate (not shown), having marginal portions extending outwardly of the marginal edges of the table member 23, may be provided for attachment on the member 23. Such carrying plate may, of course, be bolted or otherwise secured on the member 23, and may be provided with dowel sockets for receiving the upwardly extending ends of the pins 48 in order to accurately position the carrying plate on the table member 23; and work holding jigs or fixtures may, of course, be secured on the carrying plate, in any desired fashion, so that the same may be presented successively in accurately indexed position by operation of the herein described indexing mechanism.

To reinforce the wall 25, at the cavity 51, the lower side of the wall 25 may be formed with an embossment 113; and the embossment may be cut away, as at 114, to accommodate the latch connected end of the arm or link 58. Means also may be provided for yieldingly securing the link 59 in latch released and in latch engaged position. Such means may comprise a spring pressed latch member secured on the wall 25 in position to engage detents on the link 59. As shown, the latch member may comprise a ball 115 held in a pocket 116 formed in the wall 25, as in the cut-out portion 114, in position opening upon the link 58, said ball being yieldingly pressed upon the link 58, by a spring 117 in the pocket 116, and being latchingly received in either of a pair of spaced detent sockets 118 of shallow configuration.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Indexing apparatus comprising a plate turnable about a fixed axis, a plurality of circularly spaced indexing detents mounted on said plate, a latch in position to engage each of said detents to hold the plate in any selected one of a number of indexed positions corresponding with said detents when in latching registration with said latch, and driving means comprising a driving member and a driven member turnable on said axis, a driving dog on said driven member and connected with said driving member, said members and dog being normally disposed in retracted stand-by position, when said plate is latched in indexed position, with the dog retracted from but in registration with a said detent, means for turning said driving member on said axis, in one direction, to initially project the dog on the driven member into position drivingly engaging said registering detent, and thereafter to move the driven member and said detent engaged dog about said axis, whereby to turn the plate from one indexed position to another and, thereafter, in the opposite direction, to initially retract the dog from the detent with which then engaged and then to return the driven member and the retracted dog thereon to stand-by position, with the dog in registration with another of said detents, and latch actuating means, operable by said driving means, to release said latch from the detent with which latched and to relatch the same with another of said detents, respectively, as the dog is projected into and retracted from driving engagement with the said registering detent.

2. Indexing apparatus comprising a plate turnable about a fixed axis, a plurality of circularly spaced indexing detents mounted on said plate, a latch in position to normally engage each of said detents, when the same are presented in latching registration with said latch, as the plate is turned to indexed positions corresponding with said detents, whereby to hold said plate in said indexed positions, and driving means operable to turn said plate from one indexed position to another, said driving means comprising a driving member, a driven member turnable on said axis, and a driving dog on said driven member and connected with said driving member, said members and dog being normally disposed in retracted stand-by position, when said plate is latched in indexed position, with the dog retracted from but in registration with a said detent, latch means for holding the driven member against turning movement about said axis during projection of the dog thereon, and means operable by the turning movement of the driving member for releasing the latch means when the dog reaches projected position.

3. Indexing apparatus comprising a plate turnable about a fixed axis, a plurality of circularly spaced indexing detents mounted on said plate, a latch in position to normally engage each of said detents, when the same are presented in latching registration with said latch, as the plate is turned to indexed positions corresponding with said detents, whereby to hold said plate in said indexed positions, and driving means operable to turn said plate from one indexed position to another, said driving means comprising a driving member, a driven member turnable on said axis, and a driving dog on said driven member and connected with said driving member, said members and dog being normally disposed in retracted stand-by position, when said plate is latched in indexed position, with the dog retracted from but in registration with a said detent, latch means for holding the driven member against turning movement about said axis during retraction of the dog thereon, and means operable by the turning movement of the driving member for releasing the latch means when the dog reaches retracted position.

4. Indexing apparatus comprising a plate turnable about a fixed axis, a plurality of circularly spaced indexing detents mounted on said plate, a latch in position to normally engage each of said detents, when the same are presented in latching registration with said latch, as the plate is turned to indexed positions corresponding with said detents, whereby to hold said plate in said indexed positions, and driving means operable to turn said plate from one indexed position to another, said driving means comprising a driving member, a driven member turnable on said axis, and a driving dog on said driven member and connected with said driving member, said members and dog being normally disposed in retracted stand-by position, when said plate is latched in indexed position, with the dog retracted from but in registration with a said detent, latch means for holding the driven member against turning movement about said axis during projection and retraction of the dog thereon, and means operable by the turning movement of the driving member for releasing the latch means when the dog reaches projected and retracted positions.

5. Indexing apparatus comprising a plate turnable about a fixed axis, a plurality of circularly spaced indexing detents mounted on said plate, a latch in position to normally engage each of said detents, when the same are presented in latching registration with said latch, as the plate is turned to indexed positions corresponding with said detents, whereby to hold said plate in said indexed positions, and driving means operable to turn said plate from one indexed position to another, said driving means comprising a driving member, a driven member turnable on said axis, and a driving dog on said driven member and connected with said driving member, said members and dog being normally disposed in retracted stand-by position, when said plate is latched in indexed position, with the dog retracted from but in registration with a said detent, latching means for securing the driving and driven members against relative turning movement in a direction to cause retracting movement of the dog on the driven member, when said dog is in projected detent engaging position, and means operable to release said latching means as said plate reaches said relatively turned position.

6. Indexing apparatus comprising a plate turnable about a fixed axis, a plurality of circularly spaced indexing detents mounted on said plate, a latch in position to normally engage each of said detents, when the same are presented in latching registration with said latch, as the plate is turned to indexed positions corresponding with said detents, whereby to hold said plate in said indexed positions, and driving means operable to turn said plate from one indexed position to another, said driving means comprising a driving member, a driven member turnable on said axis, and a driving dog on said driven member and connected with said driving member, said members and dog being normally disposed in retracted stand-by position, when said plate is latched in indexed position, with the dog retracted from but in registration with a said detent, and latch actuating means comprising a latch driving member connected with said latch and turnable about said axis, and means operated by said dog respectively during projection and retraction thereof for turning said latch driving member about said axis.

7. Indexing apparatus comprising a plate turnable about a fixed axis, a plurality of circularly spaced indexing detents mounted on said plate, a latch in position to normally engage each of said detents, when the same are presented in latching registration with said latch, as the plate is turned to indexed positions corresponding with said detents, whereby to hold said plate in said indexed positions, and driving means operable to turn said plate from one indexed position to another, said driving means comprising a driving member, a driven member turnable on said axis, and a driving dog on said driven member and connected with said driving member, said members and dog being normally disposed in retracted stand-by position, when said plate is latched in indexed position, with the dog retracted from but in registration with a said detent, latch actuating means, operable by said driving means, to release said latch from the detent with which then latched and to relatch the same with another of said detents, respectively, as the dog is projected into and retracted from driving engagement with the said registering detent, an axially movable driving stem connected with said driving member for turning the same about said axis, and reversibly operable motive means for so driving said stem.

8. Indexing apparatus comprising a plate turnable about a fixed axis, a plurality of circularly spaced indexing detents mounted on said plate, a latch in position to normally engage each of said detents, when the same are presented in latching registration with said latch, as the plate is turned to indexed positions corresponding with said detents, whereby to hold said plate in said indexed positions, and driving means operable to turn said plate from one indexed position to another, said driving means comprising a driving member, a driven member turnable on said axis, and a driving dog on said driven member and connected with said driving member, said members and dog being normally disposed in retracted stand-by position, when said plate is latched in indexed position, with the dog retracted from but in registration with a said detent, latch actuating means, operable by said driving means, to release said latch from the detent with which then latched and to relatch the same with another of said detents, respectively, as the dog is projected into and retracted from driving engagement with the said registering detent, an axially movable driving stem connected with said driving member for turning the same about said axis, reversibly operable motive means for so driving said stem, manually operable control means for actuating the motive means in one direction, and control means operated by said indexing mechanism when the table is in said relatively turned position for actuating said motive means in the reverse direction.

9. Indexing apparatus comprising a plate turnable about a fixed axis, a plurality of circularly spaced indexing detents mounted on said plate, a latch in position to normally engage each of said detents, when the same are presented in latching registration with said latch, as the plate is turned to indexed positions corresponding with said detents, whereby to hold said plate in said indexed positions, and driving means operable to turn said plate from one indexed position to another, said driving means comprising a driving member, a driven member turnable on said axis, and a driving dog on said driven member and connected with said driving member, said members and dog being normally disposed in retracted stand-by position, when said plate is latched in indexed position, with the dog retracted from but in registration with a said detent, latch actuating means, operable by said driving means, to release said latch from the detent with which then latched and to relatch the same with another of said detents, respectively, as the dog is projected into and retracted from driving engagement with the said registering detent, an axially movable driving stem connected with said driving member for turning the same about said axis, reversibly operable motive means for so driving said stem, manually operable control means for actuating the motive means in one direction, control means operable to actuate the motive means in the reverse direction, and means on said driven member for operating said control means as said plate reaches said relatively turned position.

10. Indexing apparatus comprising a plate turnable about a fixed axis, a plurality of circularly spaced pins mounted on and projecting from said plate, a latch having a pin receiving notch and mounted in position to receive each of said pins latchingly in said notch, when said pins are presented in latching registration with respect to said latch, as the plate is turned to indexed positions corresponding with said pins, whereby to hold said plate in said indexed positions, driving means operable to turn said plate from one indexed position to another, said driving means comprising a driving member and a driven member turnable on said axis, a driving dog on said driven member and connected with said driving member, said members and dog being normally disposed in retracted stand-by position, when said plate is latched in indexed position, with the dog retracted from but in registration with a said pin, means for turning said driving member on said axis, in one direction, to initially project the dog on the driven member into position drivingly engaging said registering pin, and thereafter to move the driven member and said pin engaged dog about said axis, whereby to turn the plate from one indexed position to another, and, thereafter, in the opposite direction, to initially retract the dog from the pin with which then engaged and then to return the driven member and the retracted dog thereon to stand-by position, with the dog in registration with another of said pins, and latch actuating means, operable by said driving means, to release said latch from the pin with which latched and to relatch the same with another of said pins, respectively, as the dog is projected into and retracted from driving engagement with the said registering pin.

References Cited in the file of this patent

UNITED STATES PATENTS

| | | |
|---|---|---|
| 398,650 | Peters | Feb. 26, 1889 |
| 462,010 | Lane | Oct. 27, 1891 |
| 545,883 | Friederich | Sept. 10, 1895 |
| 556,625 | Gilchrist | Mar. 17, 1896 |
| 646,287 | Hundhausen | Mar. 27, 1900 |
| 656,380 | Smith | Aug. 21, 1900 |
| 688,656 | Lester | Dec. 10, 1901 |
| 1,049,959 | Willett | Jan. 7, 1913 |
| 1,126,084 | Reisbach | Jan. 26, 1915 |
| 2,386,432 | Bullock | Oct. 9, 1945 |
| 2,394,769 | Heckethorn | Feb. 12, 1946 |
| 2,421,327 | Hallowell | May 27, 1947 |
| 2,588,977 | Gartner et al. | Mar. 11, 1952 |
| 2,660,895 | Waters | Dec. 1, 1953 |

FOREIGN PATENTS

| | | |
|---|---|---|
| 975,654 | France | Mar. 8, 1951 |